June 16, 1942.          R. D. BROWN          2,286,951
BRUSH KNIFE
Filed Feb. 16, 1942
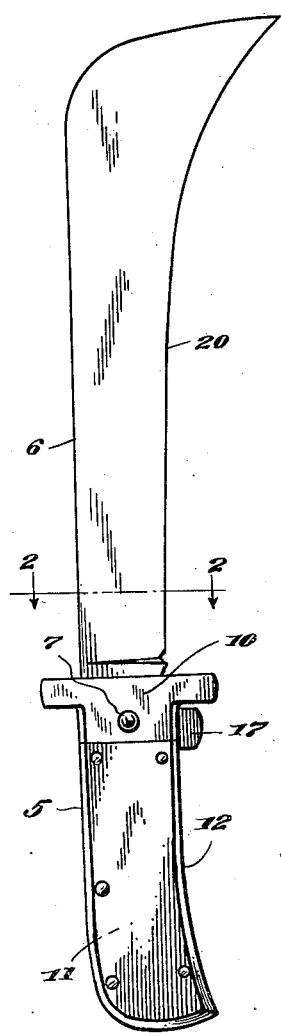
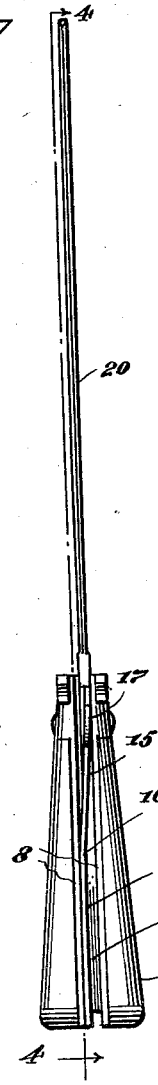
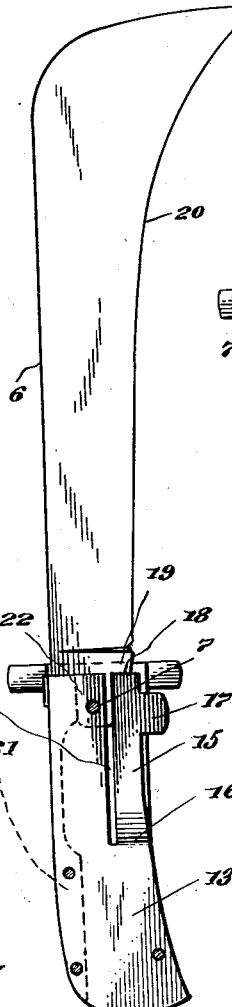
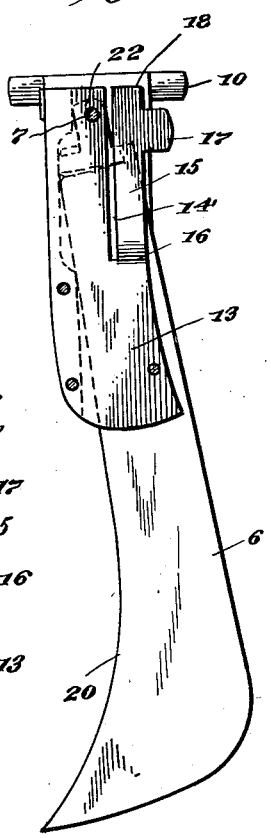
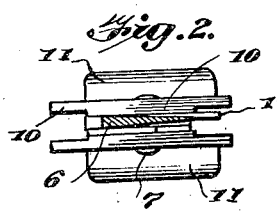
Inventor
RICHARD D. BROWN
By Lacey & Lacey,
Attorneys Patented June 16, 1942

2,286,951

UNITED STATES PATENT OFFICE 2,286,951

BRUSH KNIFE

Richard D. Brown, Olean, N. Y.

Application February 16, 1942, Serial No. 431,143

7 Claims. (Cl. 30—122)

This invention relates to knives and more particularly to an improved brush knife.

The object of the invention is to provide a brush knife of simple and inexpensive construction especially designed for cutting underbrush and all kinds of wild vegetation in jungles, marshes and heavily overgrown country.

A further object of the invention is to provide a brush knife including a handle having a cutting blade of greater length than the handle pivotally connected therewith and normally disposed in extended position for cutting cane, bamboo and other relatively tall vegetation, the pivoted end of the blade being movable to a position within the handle thereby to shorten the length of the effective cutting edge of the blade to increase the leverage thereon and permit the shortened blade to be used for grubbing purposes or for cutting relatively low growing vegetation, such as underbrush and the like.

A further object is to provide the brush knife with a novel form of latch for locking the cutting blade in extended position, said latch by frictional engagement with the pivoted end of the blade serving to prevent lateral movement of the blade within the handle when said blade is in folded position.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a side elevation of a brush knife embodying the present invention,

Figure 2 is a transverse sectional view taken on the line 2—2 of Figure 1,

Figure 3 is a front elevation,

Figure 4 is a longitudinal sectional view taken on the line 4—4 of Figure 3,

Figure 5 is a vertical sectional view showing the blade folded within the handle to shorten the effective cutting edge of said blade, and Figure 6 is a front elevation of the knife showing the blade in folded position.

The improved brush knife forming the subject-matter of the present invention comprises a handle portion 5 and a cutting blade 6 of greater length than the handle and pivotally connected therewith, as indicated at 7.

The handle 5 comprises side plates 8 spaced apart to form an intermediate slot 9 adapted to receive the pivoted end of the blade 6 when the latter is folded.

Arranged at the upper end of the handle 5 are guard plates 10, and arranged beneath the guard plates 10 and secured to the side plates 8 by rivets or other suitable fastening devices are cover plates 11. The inner edge of the handle 5 is preferably slightly concave, as indicated at 12, while the cover plates 11 of the handle preferably converge in the direction of the guard plates 10 so as to provide a wide gripping portion at the bottom of the handle, as best shown in Figure 3 of the drawing.

Fitted within the slot 9 and rigidly secured to one of the sides plates 8 is a reinforcing plate 13, the upper portion of which is slotted at 14 to form a resilient locking member preferably in the form of a latch 15. The fixed end of the latch 15 is bent inwardly at a slight angle to the adjacent side plate 8, as indicated at 16, so as to cause the free end of the latch to normally bear against and frictionally engage the companion side plate 8, said latch being provided with a laterally extended finger-piece 17 preferably disposed immediately below the guard plates 10. The upper end of the locking member or latch 15 is provided with a flat portion 18 adapted to bear against the heel 19 of the pivoted end of the blade 6 and thus hold the blade in longitudinal alinement with the handle when it is desired to use the knife for cutting cane, bamboo and other relatively tall vegetation.

By pressing laterally on the finger-piece 17 the flat end 18 of the locking member will be disengaged from the heel 19 of the blade so as to permit the blade to be swung downwardly on its pivot 7 to folded position within the slot 9 of the handle, thereby shortening the length of the effective cutting edge 20 of the blade to increase leverage thereon and permit the shortened blade to be used for grubbing purposes or for cutting relatively low growing vegetation, such as underbrush and the like.

It will here be noted that, when the blade 6 is moved to folded position within the slot in the handle 5, the free end of the locking member or latch 15 will exert lateral tension on the blade so as to hold the blade firmly within the handle and prevent lateral movement thereof within the slot when the knife is in use. In other words, the latch or locking member 15 is so constructed that, when the blade is in extended position for cutting tall vegetation, the flat portion 18 of the latch by engagement with the heel of the blade will lock the blade in extended position and when said blade is folded within the handle the lateral tension of the latch due to the bent portion 16 thereof by engagement with the adjacent side face of the blade will prevent the blade from wobbling within the handle. The handle 5 is provided with a back spring 21 against which the reduced shank 22 of the blade bears in the usual manner when moving said blade to extended or folded positions.

It will thus be seen that under normal conditions the blade is locked in extended position and by grasping the handle 5 said blade may be used for cutting cane, bamboo and other tall growing vegetation in the same manner as a machete. By releasing the locking device and swinging the blade to folded position within the handle, the length of the effective cutting edge of the blade will be reduced so that a person by grasping the handle and the rear edge of the blade can use the device for grubbing or cutting underbrush and the like. The pivoted movement of the blade also permits the blade to be compactly folded when transporting or shipping knives from place to place.

It will, of course, be understood that the knives may be made in different sizes and shapes and constructed of any suitable material without departing from the spirit of the invention.

Having thus described the invention, what is claimed as new is:

1. A knife comprising a handle, and a cutting blade of greater length than the handle pivotally connected therewith and having its pivoted end movable to folded position within the handle to shorten the length of the effective cutting edge of the blade.

2. A knife comprising a handle, a cutting blade of greater length than the handle pivotally connected therewith and having its pivoted end movable to folded position within the handle to shorten the length of the effective cutting edge of the blade, and means for locking the blade in longitudinal alinement with the handle, said locking means by frictional engagement with the pivoted end of the blade serving to prevent lateral movement of the blade when folded within the handle.

3. A knife comprising a handle having a longitudinal slot opening through the opposite ends of the handle, a cutting blade of greater length than the handle pivotally mounted in the slot at one end of said handle and having its pivoted end movable to folded position within the slot of the handle to shorten the length of the effective cutting edge of the blade, and a spring latch mounted within the slot in the handle for locking the blade in longitudinal alinement with said handle, said latch serving to exert tension on the pivoted end of the blade when the latter is in folded position thereby to prevent lateral movement of the blade within the handle.

4. A knife comprising a handle having a longitudinal slot opening through the opposite ends thereof, a cutting blade of greater length than the handle pivotally connected therewith and having its pivoted end movable to folded position within the slot of the handle to shorten the length of the effective cutting edge of the blade, a reinforcing plate disposed within the slot and having a longitudinal incision formed therein defining a spring latch adapted to bear against the pivoted end of the blade for locking said blade in open position, said latch being provided with an offset portion for causing the latch to exert lateral tension on the blade when the latter is folded within the slot of the handle.

5. A knife including a handle having side plates spaced apart to form an intermediate slot opening through the opposite ends of the handle, a cutting blade pivotally mounted within the slot at one end of the handle, a reinforcing plate secured to one of the side plates and provided with a longitudinal slot defining a resilient latch inclined in the direction of the other side plate and adapted to engage the pivoted edge of the blade for holding said blade in extended position, said latch being provided with a finger-piece and movable to a position in frictional engagement with the blade when the latter is moved to folded position within the slot of the handle.

6. A knife including a handle having side plates spaced apart to form an intermediate slot opening through the opposite ends of the handle, cover plates secured to the side plates, guard plates secured to the upper end of the handle at opposite sides thereof, a blade pivotally mounted between said guard plates and provided at its pivoted end with a shoulder, a reinforcing plate secured to one of the side plates and having a longitudinal slot formed in one end thereof defining a resilient locking latch, the free end of which is provided with a flat face adapted to engage the shoulder on the pivoted end of the blade for locking the blade in extended position, said latch being provided with a laterally extending finger-piece disposed at one side of the guard plates and said latch being adapted to frictionally engage the blade when said blade is moved to folded position within the slot of the handle.

7. A knife including a handle having side plates spaced apart to form an intermediate slot opening through the opposite ends of the handle, downwardly tapered cover plates secured to the side plates, a rear spring disposed between said side plates, guard plates secured to the upper end of the handle at opposite sides thereof, a blade pivotally mounted between the guard plates and having a reduced shank bearing against the spring and defining a shoulder, a reinforcing plate secured to one of the side plates and provided at one end thereof with a longitudinal slot defining a resilient latch having a flat terminal adapted to bear against the shoulder on the blade for holding the blade normally in alinement with the handle, said latch at its junction with the reinforcing plate being deflected inwardly in the direction of the other side plate and provided with a finger-piece, the deflected end of the latch being adapted to frictionally engage the blade when the latter is folded within the slot of the handle.

RICHARD D. BROWN.